(12) United States Patent
Helman et al.

(10) Patent No.: US 6,400,371 B1
(45) Date of Patent: Jun. 4, 2002

(54) TELEVISION SIGNAL CHROMINANCE ADJUSTMENT

(75) Inventors: James Helman, San Carlos; David Mott, Mountain View; Chee Yu, Dublin, all of CA (US)

(73) Assignee: Liberate Technologies, San Carlos, CA (US)

( * ) Notice: Subject to any disclaimer, the term of this patent is extended or adjusted under 35 U.S.C. 154(b) by 0 days.

(21) Appl. No.: 09/081,486

(22) Filed: May 18, 1998

Related U.S. Application Data

(60) Provisional application No. 60/046,730, filed on May 12, 1997.

(51) Int. Cl.[7] .............................. G09G 5/04; H04N 9/64; H04N 9/11
(52) U.S. Cl. ....................... 345/589; 345/590; 345/592; 348/577; 348/631; 348/650; 382/162
(58) Field of Search ................................. 348/577, 587, 348/592, 630, 631, 650, 708, 254, 283, 645, 649, 602–603, 658, 191; 345/589–592, 597, 593, 114, 150, 157, 507, 509, 419, 433, 436, 473; 382/162, 164, 165, 283, 238; 709/218–220

(56) References Cited

U.S. PATENT DOCUMENTS

| | | | | |
|---|---|---|---|---|
| 4,035,835 A | * | 7/1977 | Poetsch ..................... | 348/254 |
| 4,589,013 A | * | 5/1986 | Vlahos ....................... | 358/22 |
| 4,694,329 A | * | 9/1987 | Belmares-Sarabia ........ | 358/22 |
| 4,893,114 A | * | 1/1990 | Ishii .......................... | 340/703 |
| 5,155,847 A | | 10/1992 | Kirouac et al. | |
| 5,347,622 A | * | 9/1994 | Takemoto .................. | 395/135 |
| 5,373,561 A | | 12/1994 | Haber et al. ................ | 380/49 |
| 5,436,673 A | * | 7/1995 | Bachmann .................. | 348/645 |
| 5,444,861 A | | 8/1995 | Adamec et al. | |
| 5,453,779 A | | 9/1995 | Dan et al. ................... | 348/7 |
| 5,495,610 A | | 2/1996 | Shing et al. | |
| 5,497,422 A | | 3/1996 | Tysen et al. ................. | 380/25 |
| 5,541,638 A | | 7/1996 | Story ......................... | 348/7 |
| 5,600,364 A | | 2/1997 | Hendricks et al. .......... | 348/1 |
| 5,634,051 A | | 5/1997 | Thomson ................... | 707/5 |
| 5,680,458 A | | 10/1997 | Spelman et al. | |
| 5,708,845 A | | 1/1998 | Wistendahl et al. ........ | 345/302 |
| 5,727,129 A | | 3/1998 | Barrett et al. ............. | 395/200.47 |
| 5,752,042 A | | 5/1998 | Cole et al. | |

(List continued on next page.)

OTHER PUBLICATIONS

Bussey H E Et Al: "Service Architecture, Prototype Description, And Network Implications Of A Personalized Information Grazing Service" Multiple Facets Of Integration, San Francisco, Jun. 3–7, 1990 Institute Of Electrical And Electronic Engineers, pp. 1046–1053, XP000164339 see whole document.

(List continued on next page.)

Primary Examiner—Matthew Luu
Assistant Examiner—Wesner Sajous
(74) Attorney, Agent, or Firm—Michael A. Glenn

(57) ABSTRACT

The invention provides an improved method and system for presenting color television signals. Television signal chrominance values for foreground elements are adjusted in response to television signal chrominance values for background elements, so as to minimize display artifacts while preserving the relative color contrast between foreground and background. (1) The invention modifies I and Q values of the foreground color to reduce the difference of the foreground I and Q with respect to the background I and Q. (2) The invention modifies Y, I and Q values of the foreground color to avoid colors known to display poorly for selected output devices. (3) The invention modifies Y values of the foreground color to maintain intended visual contrast between foreground and background colors. (4) The invention modifies Y, I and Q values of the foreground color to decrease cross-luminance separation artifacts at the border between foreground and background colors.

10 Claims, 1 Drawing Sheet

U.S. PATENT DOCUMENTS

| | | | |
|---|---|---|---|
| 5,754,938 A | | 5/1998 | Herz et al. ............. 395/200.49 |
| 5,754,939 A | | 5/1998 | Hertz et al. ................... 455/4.2 |
| 5,761,306 A | | 6/1998 | Lewis .......................... 380/21 |
| 5,764,992 A | | 6/1998 | Kullick et al. |
| 5,787,172 A | | 7/1998 | Arnold ......................... 380/21 |
| 5,796,840 A | | 8/1998 | Davis .......................... 380/50 |
| 5,808,628 A | * | 9/1998 | Hinson ....................... 345/157 |
| 5,809,287 A | | 9/1998 | Stupeck, Jr. et al. |
| 5,841,896 A | * | 11/1998 | Tsuchiya .................... 345/327 |
| 5,850,232 A | | 12/1998 | Engstrom et al. ........... 345/511 |
| 5,852,673 A | * | 12/1998 | Young ........................ 382/164 |
| 5,859,969 A | | 1/1999 | Oki et al. |
| 5,861,871 A | * | 1/1999 | Venable ...................... 345/150 |
| 5,867,166 A | * | 2/1999 | Myhrvold ................... 345/433 |
| 5,870,559 A | * | 2/1999 | Leshmen ............... 395/200.54 |
| 5,870,765 A | | 2/1999 | Bauer et al. ................. 707/203 |
| 5,874,967 A | | 2/1999 | West et al. ................. 345/435 |
| 5,877,741 A | | 3/1999 | Chee et al. ................. 345/113 |
| 5,907,315 A | * | 5/1999 | Vlahos ....................... 345/114 |
| 5,926,624 A | | 7/1999 | Katz et al. |
| 5,936,606 A | | 8/1999 | Lie ............................. 345/113 |
| 5,977,960 A | | 11/1999 | Nally et al. ................. 345/191 |
| 5,991,799 A | * | 11/1999 | Yen ............................ 709/218 |
| 6,005,574 A | | 12/1999 | Herrod ....................... 345/344 |
| 6,009,363 A | | 12/1999 | Beckert et al. ............... 701/33 |
| 6,018,768 A | | 1/2000 | Ullman et al. .............. 709/218 |
| 6,028,583 A | | 2/2000 | Hamburg .................... 345/112 |
| 6,047,269 A | | 4/2000 | Biffar ........................... 705/39 |
| 6,049,628 A | * | 4/2000 | Chen .......................... 382/238 |
| 6,049,835 A | | 4/2000 | Gagnon ...................... 709/245 |
| 6,104,727 A | | 8/2000 | Moura et al. ............... 370/468 |

OTHER PUBLICATIONS

Wyle M F: "A Wide Area Network Information Filter" Proceedings International Conference Artificial Intelligence On Wall Street, Oct. 9, 1991, pp. 10–15, XP000534152 see the whole document.

Lang K: "NewsWeeder: learning to filter netnews" Machine Learning. Proceedings Of The Twelfth International Conference On Machine Learning, Tahoe City, CA, USA, Jul. 9–12, 1995, San Francisco, CA, USA, Morgan Kaufmann Publishers, USA, pp. 331–339, XP002046557 see the whole document.

Rosenfeld L B, et al: "Automated Filtering Of Internet Postings" Online, vol. 18, No. 3, May 1994, pp. 27–30, XP000616769 see the whole document.

Yan T W, et al: "Sift—A Tool For Wide–Area Information Dissemination" Usenix Technical Conference, Jan. 16, 1995, pp. 177–186, XP000617276 see the whole document.

* cited by examiner

TELEVISION SIGNAL CHROMINANCE ADJUSTMENT

CROSS-REFERENCE TO RELATED APPLICATIONS

This application claims priority of the following applications:

Application Ser. No. 08/770,238, filed Dec. 20, 1996, in the name of inventors Wei Yen and Steven Weinstein, titled "Internet Multiplexer for Broadcast and Other Information," and Provisional Application Ser. No. 60/046,730, filed May 12, 1997, in the name of inventors James Helman, Mark Vickers, David Mott, and Chee Yu, titled "Improved TV Quality".

Each of these applications is hereby incorporated by reference as if fully set forth herein.

BACKGROUND OF THE INVENTION

1. Field of the Invention

The invention relates to television signals.

2. Related Art

Television transmitters and receivers use a known standard encoding for signals describing the television picture to be broadcast and displayed. Known television signal encoding includes standards known as NTSC (used in the United States), SECAM (used in France), and PAL (used in Germany). Each of these television signal standards represents the television picture using three components: Y (luminance), I and Q (the two components of chrominance). These television signals are referred to as being in YIQ format (or in YUV format, which is similar).

One problem in the known art is that there is difficulty in displaying foreground text in color against a background color or another underlying image (such as a dynamic image as in broadcast television). Depending on the choice of foreground color, the text can be difficult to read, can present substantial flicker (even for static pictures), and can present visual artifacts at borders of color changes in the background. Many artifacts are themselves introduced by attempts by television receivers to separate the Y component from the I and Q components when they have been combined into a single composite video signal.

Accordingly, it would be desirable to provide an improved method and system for presenting color television signals. This advantage is achieved in an embodiment of the invention in which television signal luminance and chrominance values for foreground elements are adjusted in response to television signal chrominance values for background elements, so as to minimize display artifacts while preserving the relative visual contrast between foreground and background.

SUMMARY OF THE INVENTION

The invention provides an improved method and system for presenting color television signals. Television signal luminance and chrominance values for foreground elements are adjusted in response to television signal chrominance values for background elements, so as to minimize display artifacts while preserving the relative color contrast between foreground and background.

The invention modifies chrominance values of the foreground color to reduce the difference of the foreground chrominance by a scaling factor with respect to the background chrominance, and the luminance value of the foreground color by the same scaling factor to maintain intended visual contrast between foreground and background colors. In this manner, through appropriate choices of scaling factors, the invention modifies the luminance and chrominance values of the foreground color to avoid color combinations known to display poorly for selected output devices.

An embodiment of the invention modifies the luminance and chrominance values of the foreground color to decrease cross-luminance separation artifacts at the border between foreground and background colors.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, or other special purpose circuits, and that implementation of the preferred process steps and data structures described herein using such equipment would not require undue experimentation or further invention.

Application and System Elements

The invention provides an improved method and system for presenting color television signals, which corrects for differences in foreground and background colors which generate video artifacts.

Application

The application of the invention relates to the display of images generated by a computer onto a standard television screen. Such images often develop visually-distracting artifacts when so displayed on a standard television, due to the lower resolution and other characteristics of television screens which differ from high resolution computer monitors.

An application of the instant invention is the display of text from a computer onto a television screen. Text generated by a computer is often difficult to read when so displayed on a standard television, due to increased video artifacts associated with the lower resolution and other characteristics of the television screen. As described above, prior art chrominance adjustment techniques may fail to provide sufficient textual clarity. This makes display of text on standard televisions problematic. This invention solves these problems.

For example, it would be desirable to display on a television world-wide web 'pages' or other documents generated using HTML (Hyper-Text Markup Language), the language in which web pages are presently written. The visual components of such documents comprise combinations of graphic and textual material. Frequently on such pages, text is displayed directly over graphic images. In particular, this invention addresses the problem of increasing the frequency of such visual displays by decreasing the cross-luminance separation artifacts at the border between foreground and background colors.

In addition, standard television and other consumer video displays have slightly different characteristics than high resolution computer monitors, specifically, default settings have exaggerated chrominance and a slightly different gamma level. Hence, the color rendition on these televisions is sometimes significantly different from that which the web content designer expects, given that such content is designed for computer monitors.

System elements

Figure 1:
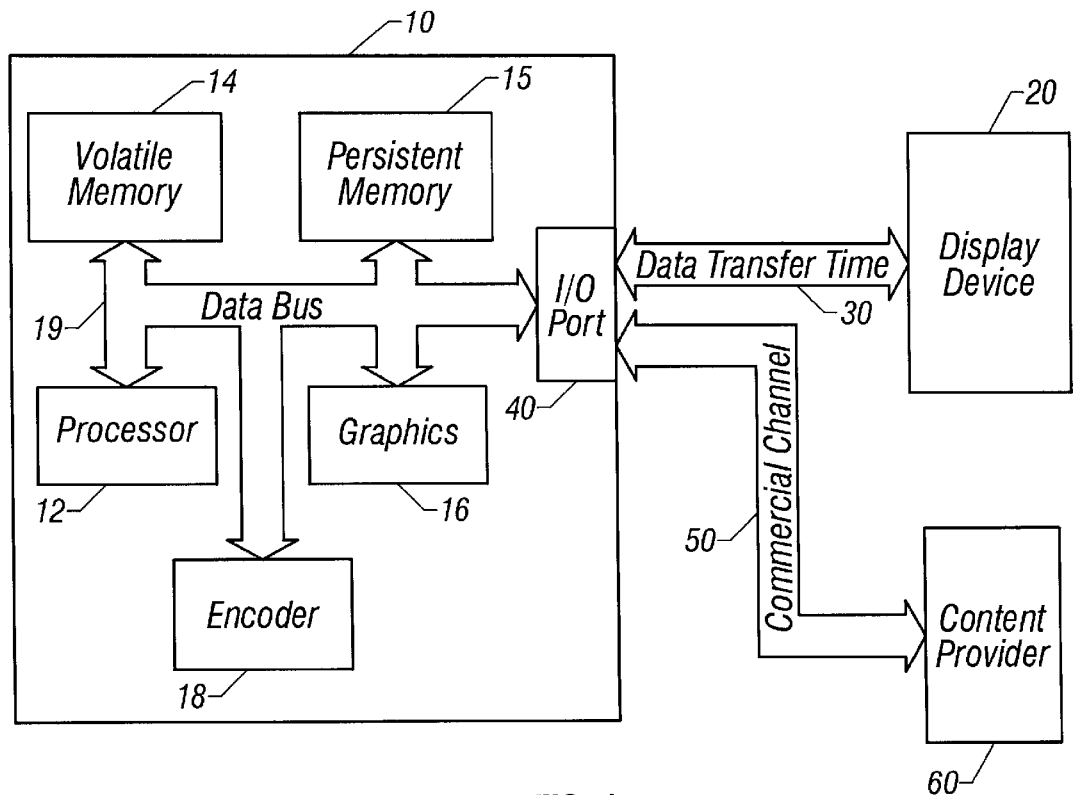
FIG. 1 shows a block diagram of a system for television signal chrominance adjustment.

FIG. 1 shows a block diagram of a system for television signal chrominance adjustment.

A set top device 10 has a processor 12 connected to a volatile memory 14, a persistent memory 15, a graphics processor 16, and an encoder 18 through a data bus 19. Display device 20 is connected to set top device 10 via data transmission line 30. Content provider 60 is connected to set top device 10 via communication channel 50.

Communication channel 50 comprises a telephone line, ISDN line, cable, fiberoptic, or any other data transfer line and is connected to network interface device connected to, or contained within, I/O port 40. Such a connection links client device 10 through a network, either a private intranet or the public Internet to any of a plurality of content providers 60.

Method of Operation

Figure 2:
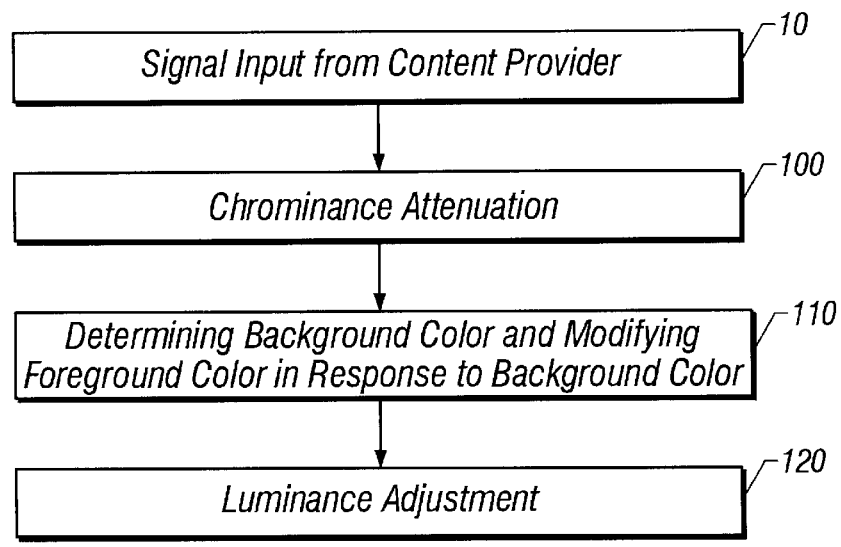
FIG. 2 shows a process flow diagram of a method for television signal chrominance adjustment.

FIG. 2 shows a process flow diagram of a method for television signal chrominance adjustment.

Chrominance Attenuation

Initially, to correct for the exaggerated chrominance on television sets, at step 100 the invention attenuates the chrominance slightly, by a factor equal to the phase of the chrominance pair (U,V in the YUV format), with the phase= arctangent (U/V). This attenuation is applied separately to both the foreground and background colors, which will each have its own correction factor based upon its own phase.

More specifically, the chrominance Cf of the foreground color is modified such that the difference (delta C) between the foreground chrominance Cf and background chrominance Cb is reduced by a scaling factor determined from the phases of the chrominance pair for the foreground and background colors. This allows for correction of cross-luminance artifacts by more heavily reducing the chrominance differences for particularly bad color combinations.

Determining Background Color

Next at step 110 the overall visual presentation of the web page is improved and many artifacts eliminated by determining the background color and modifying the foreground color in response to the background. Where the colors vary with the document's content, several alternative methods can be used for determining the colors. A color histogram can be generated for the entire document or frame, from which an appropriate determination of colors can be derived. Alternatively, a locally weighted histogram can be generated for each pixel or for blocks of pixels. Such an approach is more computation-intensive, but can be necessary when the colors are expected to vary widely over the entire document or frame.

As noted above, the background color is variable over time if a dynamically-varying background image is present. In such a case, the background color must be redetermined and chrominance correction recomputed. Such recomputation may be performed either on a regular basis at pre-determined time intervals, or when the image locally changes by more than a pre-determined threshold amount. Also, some digital video formats, such as MPEG, utilize techniques which redraw only portions of the image which have changed. An embodiment of the present invention takes advantage of such techniques by only recomputing background color for areas where such redraws occur.

It should be noted that several of the methods of determining the background color in an HTML web page display described above also have corresponding methods of influencing the color scheme which may be implemented in accordance with the present invention. For example, the preferred embodiment of the present invention responds to HTML codes in the source document by modifying the foreground color. Similarly, some embodiments of the system respond to settings from the hardware of the television or video monitor, or from the web browser displaying the page.

Luminance Adjustment

Finally, at step 120 the luminance Y of the foreground color is modified such that the difference (delta Y) between the foreground luminance Yf and background luminance Yb is increased by the same scaling factor used to reduce the chrominance. By increasing the luminance difference by the same scaling factor as the chrominance difference is decreased, visual contrast between the foreground and background colors is maintained.

Since the present invention adjusts the chrominance of an image to improve contrast between the foreground and background, it requires determination of colors for that display. There are several major methods by which colors can be set on a display, and hence different ways of deriving the color scheme.

Often a manufacturer of a display unit has preset color schemes as part of the display system. These are either set in the hardware of a video display (either hardwired or set in a reprogrammable non-volatile memory) or in the software which is used to display the documents, such as a web browser. This method of setting colors has advantages in visual clarity, as it allows the manufacturer to set colors which minimize artifacts between foreground and background colors.

In addition, manufacturer's presets can be changed and the defaults customized according to a user's needs. For example, web browsing software allows users to define default values for foreground text and backgrounds. Also, color settings in the display monitor itself are varied by changing values in the reprogrammable non-volatile memory. While allowing the user to choose colors is less desirable from the point-of-view of minimizing artifacts, it does allow the user to choose colors which are more legible or visually appealing to the user on their particular video display. Determining the background color is simple, as it is pre-specified by the user.

Further, HTML tags or other instructions which set colors can be embedded directly in the document by the document's author. This is a common practice, as it gives the document's author greater control over the visual presentation. Such instructions take precedence over any values specified by the video manufacturer, web browser or user settings. Determining the colors is again simple, as it is directly specified.

Finally, text or images or other graphic elements are displayed directly onto the page, or layered over one another, and hence the foreground and background colors can be defined by the graphics of the page. This is the most complex situation for determining the colors, as the colors often vary significantly both globally, over the entire document, and locally. Furthermore, some graphic elements change with time, such as image slide shows, animated graphics, television broadcasts, video-camera feeds, etc.

Hence, the color scheme will change with time as these graphic elements change.

As will be obvious to those skilled in the art of the present invention, the invention has widespread applicability to elements in a video display, including text, icons, chyrons, animated images, and other graphic elements which will become obvious from the above discussion.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A system for modifying color video signals representing a visual image for display on a television, said system comprising:

a color recognizer for recognizing foreground and background colors in the visual image;

a color modifier for modifying luminance and chrominance of said foreground colors in response to the recognized foreground and background colors;

wherein the visual image comprises a document generated in HTML, and said color modifier is further responsive to HTML codes in said document.

2. A system for modifying color video signals representing a visual image for display on a television, said system comprising:

a color recognizer for recognizing foreground and background colors in the visual image;

a color modifier for modifying luminance and chrominance of said foreground colors in response to the recognized foreground and background colors;

wherein the visual image comprises a document generated in HTML, and said color modifier is further responsive to controls in a web browser responsive to said document.

3. A system for modifying color video signals representing a visual image for display on a television, said system comprising:

a color recognizer for recognizing foreground and background colors in the visual image;

a color modifier for modifying luminance and chrominance of said foreground colors in response to the recognized foreground and background colors;

wherein the visual image comprises a document generated in HTML, and said color modifier is further responsive to the visual content of said document.

4. A system for modifying color video signals representing a visual image for display on a television, said system comprising:

a color recognizer for recognizing foreground and background colors in the visual image;

a color modifier for modifying luminance and chrominance of said foreground colors in response to the recognized foreground and background colors;

wherein said color modifier is further responsive to control codes generated by the television.

5. The system of claim 4 wherein said control codes can be modified by the television user.

6. A method of modifying color video signals representing a visual image for display on a television, said method comprising:

recognizing foreground and background colors in the visual image; and modifying chrominance and luminance of said foreground colors in response to the recognized foreground and background colors;

wherein the visual image comprises a document generated in HTML, and said step of modifying said foreground color further comprises responding to HTML codes in said document.

7. A method of modifying color video signals representing a visual image for display on a television, said method comprising:

recognizing foreground and background colors in the visual image; and modifying chrominance and luminance of said foreground colors in response to the recognized foreground and background colors;

wherein the visual image comprises a document generated in HTML, and said step of modifying said foreground color further comprises responding to controls in a web browser for viewing said document.

8. A method of modifying color video signals representing a visual image for display on a television, said method comprising:

recognizing foreground and background colors in the visual image; and modifying chrominance and luminance of said foreground colors in response to the recognized foreground and background colors;

wherein the visual image comprises a document generated in HTML, and said step of modifying said foreground color further comprises responding to the visual content of said document.

9. A method of modifying color video signals representing a visual image for display on a television, said method comprising:

recognizing foreground and background colors in the visual image; and modifying chrominance and luminance of said foreground colors in response to the recognized foreground and background colors;

wherein said step of modifying said foreground color further comprises responding to control codes generated by the television.

10. The method of claim 9 wherein said control codes may be modified by the television user.

* * * * *